July 15, 1958

R. F. ANDERSON ET AL
THERMOELECTRIC GENERATOR AND
METHOD OF MAKING THE SAME
Filed Jan. 20, 1954

2,843,647

INVENTORS
ROBERT F. ANDERSON
RAYMOND P. FLAGG
BY RALPH T. OSEN

*George H Fisher*

ATTORNEY

United States Patent Office 2,843,647
Patented July 15, 1958

2,843,647

THERMOELECTRIC GENERATOR AND METHOD OF MAKING THE SAME

Robert F. Anderson, St. Louis Park, Raymond P. Flagg, Mounds Township, Ramsey County, and Ralph T. Osen, Golden Valley, Minn., assignors to Minneapolis-Honeywell Regulator Company, Minneapolis, Minn., a corporation of Delaware Application January 20, 1954, Serial No. 405,207

9 Claims. (Cl. 136—4)

This invention relates to thermoelectric generators, of the type wherein a thermocouple or thermopile is enclosed in a protective case and a portion of the case is adapted to be heated by a burner, and to the method of making them.

While thermoelectric generators of the above mentioned type are very old and the art is highly developed, the various companies in the heating controls industry are constantly striving to make less expensive, smaller and better generators that will produce enough current to operate controls and yet be small enough and durable enough to be used in locations where space is very limited and frequent servicing or replacement thereof would be quite costly. Therefore, one of the objects of this invention is to provide an improved thermoelectric generator which is small, efficient, durable and of inexpensive construction.

Another object of the invention is to produce a thermocouple or thermopile wherein the thermocouple elements are electrically insulated from each other and a protective case by means of glass completely surrounding and at least partially separating adjacent thermocouple elements wherein the glass is fused to the thermocouple elements and to the case to provide good heat transfer therebetween.

A further object of the invention is to provide a simple and inexpensive method of making such a generator.

A still further object of the invention is to enable glass insulated thermocouple generators to be made so as to have the glass fused to the thermocouple elements substantially the full lengths thereof and to the entire inside of its protective case.

Other objects of the invention will become apparent upon reading the following detailed description of the invention in conjunction with the accompanying drawing wherein.

Figure 1:
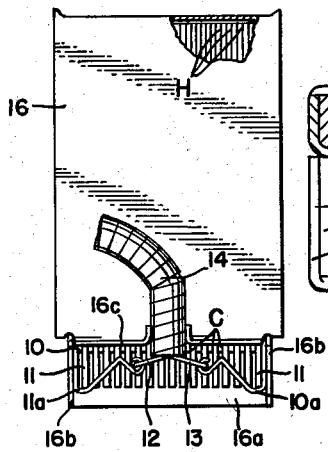
Figure 1 is an elevation view of a thermopile constructed according to this invention with a cover therefor removed and with no glass insulation therein and with a portion of the case broken away.
Figure 3:
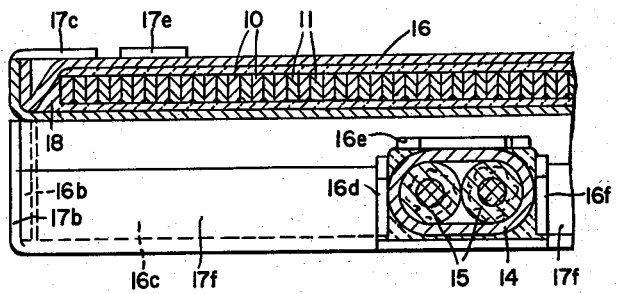
Figure 3 is an enlarged cross-sectional view of the generator taken along line 3—3 of Figure 2.
Figure 2:
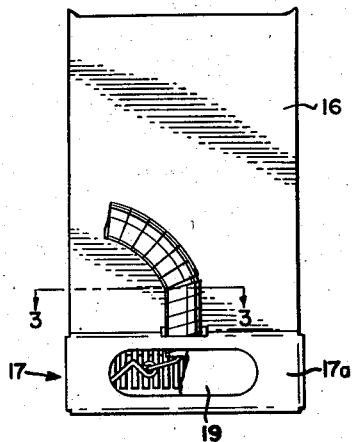
Figure 2 is a view of the invention similar to that of Figure 1 with the cover for the open end of the case in place but with a portion of the glass insulation broken away.
Figure 4:
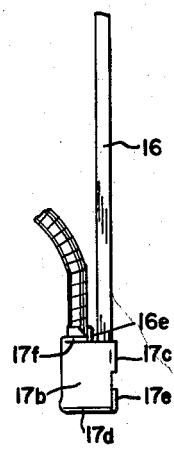
Figure 4 is a side view of the generator.
Figure 5:
Figure 5 is an enlarged view of the top end of the case, with portions broken away.

As can be best seen in Figures 1 and 3, the invention is illustrated in the form of a thermopile consisting of alternate strips of Chromel 10 and Copel 11 having oxidized surfaces and connected in series by being welded together at alternate adjacent ends thereof in a conventional manner to form hot junctions "H" and cold junctions "C". The Copel strips are longer than the Chromel strips as they are better heat conductors and their extensions act as heat dissipating fins. The Chromel element 10a at one end of the thermopile and the Copel element 11a at the other end of the thermopile are much longer than the other similar elements. They are bent transversely and toward each other and are joined to a pair of lead wires 12 and 13 in an armored cable 14. Each of the wires is surrounded by insulations 15 and has a bare extension that is mechanically attached to one of the thermocouple elements and soldered or welded thereto.

A protective case 16, formed from sheet stainless steel or other suitable material, by stamping, folding the sheet along a line, which is the top of the case in Figure 1, and seam welding the abutting side edges of the sheet folds together in a conventional manner, has a closed upper end and an open lower end. The open end has one of the side walls extending to a point below the lowermost ends of the thermopile, as shown at 16a. This extension has laterally extending wings 16b which extend across the ends of the thermopile. The other side of the case has a transverse extension 16c which is cut at its midportion and bent to form an opening with three upstanding ears 16d, 16e and 16f, through which the cable 14 extends.

A cap 17 cut and shaped from sheet metal, such as steel, has an apertured side wall 17a, two transversely extending end walls 17b with ears 17c bent inwardly over the extension 16a, a transversely extending bottom wall 17d with ears 17e bent upwardly over the extension 16a, and a pair of relatively short transversely extending walls 17f overlying the extension 16c and abutting the walls 16d and 16f, respectively.

The entire case is filled with glass 18 that has been fused to the case and to the surfaces of the thermocouple elements, both around and therebetween. The cap is filled with a zirconium oxide cement 19.

The glass before it was fused in the case consisted of a slurry formed of ninety or more parts by weight of National Bureau of Standards frit No. 332 and ten or less parts by weight of a second frit, to be presently described, to which is added about 1% bentonite clay and enough water to form a paste-like slurry.

The frits are prepared separately. The preparation consists of smelting raw additions at 2300–2400° F., shattering into water, drying, and grinding to 325 mesh screen size. The first mentioned frit is as follows:

*N. B. S. Frit No. 332*

| Additions | Parts/Wt. | Smelted Constituents | |
|---|---|---|---|
| | | Oxide | Parts/Wt. |
| Flint (SiO₂) | 37.50 | SiO₂ | 37.5 |
| Barium Carbonate | 56.63 | BaO | 44.0 |
| Boric Acid | 11.50 | B₂O₃ | 6.5 |
| Calcium Carbonate | 6.25 | CaO | 3.5 |
| Zinc Oxide | 5.00 | ZnO | 5.0 |
| Hydrated Alumina | 1.52 | Al₂O₃ | 1.0 |
| Zirconium Oxide | 2.50 | ZrO₂ | 2.5 |
| | 100.00 | | 100.0 |

The second mentioned frit is as follows:

*Second Frit*

| Constituents: | Percent wt. |
|---|---|
| Na₂O | 10.0 |
| BaO | 35.0 |
| B₂O₃ | 25.0 |
| SiO₂ | 25.0 |
| ZrO₂ | 5.0 |
| | 100.0 |

The first mentioned frit has a melting temperature of about 1700° F. while that of the second frit is about 1550° F. As the reducing properties of the second frit are quite strong and the wetting properties are better than that of the first frit, it is desirable to keep the amount thereof in the mixture to a minimum, so as not to reduce the oxide insulating coating on the thermocouple elements and cause them to short out. Also, since the second frit will fuse to the case and the thermocouple elements at a lower temperature than the first frit, it is not necessary for the melting temperature for the first frit to be maintained very long to get complete fusion without driving off more gas which may result in expelling the elements or in the formation of undesired gas pockets in the glass insulation with a resultant loss in heat transfer between the case and the thermocouple elements.

The thermopile is made by welding the thermocouple elements together at the hot and cold junctions; baking the thermopile thus formed in an oven at 1600° F. to oxidize their surfaces; partially filling the case with a slurry of glass frit described above; inserting the thermopile into said case while constantly vibrating the case to work the slurry around the elements; drying the slurry in an oven at 150°–300° F.; firing the assembly in an oven at a temperature from 1675°–1725° F. from 2.5 to 3 minutes; connecting the leads to the end thermocouple elements; securing the cap in place on the case; filling the cap with zirconium oxide cement; and then slowly drying the cement in an oven at from 150° to 350° F.

While the preferred embodiment of the invention has been described above, it is to be understood that modifications may be made therein without departing from the spirit of the invention. Therefore, the scope of the invention is to be determined solely from the appended claims.

We claim as our invention:

1. A thermoelectric generator comprising a metallic case, a thermocouple unit of dissimilar metals in said case and fused glass frit substantially completely surrounding said thermocouple unit and fused thereto and to said case to provide electric insulation and heat transfer means between said case and said thermocouple unit substantially throughout the length of the thermocouple unit, said frit consisting of at least ninety percent of high melting point frit and no more than ten percent of low melting point frit.

2. In a thermoelectric generator the combination comprising a thermopile of strips of dissimilar metals having oxidized surfaces and joined together at one of their ends to form a hot junction, a metallic protective case enclosing said thermopile and spaced a short distance therefrom, and glass filling substantially completely the space between and fused to said dissimilar metals and case, said glass consisting of a fused mixture of glass frit having a high melting point and a much smaller amount of glass frit having a much lower melting point and better surface wetting properties.

3. A thermoelectric generator comprising a metallic case, a thermocouple unit of dissimilar metals in said case, and glass substantially completely surrounding said thermocouple unit and fused thereto and to said case to provide electric insulation and heat transfer means between said case and said thermocouple unit, said glass being formed from a mixture of at least ninety percent high and of no more than ten percent substantially lower melting point glass frits.

4. In a thermoelectric generator the combination comprising a thermocouple including at least two dissimilar metals joined together at one of their ends to form a hot junction, a protective metallic case enclosing said thermocouple and spaced a short distance therefrom, and glass filling the space between and being fused to said dissimilar metals and case, said glass consisting of a mixture of glass frit having a high melting point and a much smaller amount of glass frit having a much lower melting point and better surface wetting properties.

5. In a thermoelectric device, a metallic case, thermoelectric elements of dissimilar metals joined together in said case, and an electrically insulating and heat conducting material consisting of a mixture including a relatively high melting point glass frit and a smaller proportion of much lower melting point glass frit of sufficient amount to wet the internal surface of the case and the exposed surfaces of the thermoelectric elements, said mixture being fused to said elements and said case and around the junction of said thermoelectric elements.

6. The combination comprising a thermopile of dissimilar metals, a metallic protective case enclosing said thermopile and spaced therefrom, and glass between and fused to said thermopile and case, said glass including a mixture of at least ninety percent by weight of glass frit having a high melting point and up to ten percent by weight of glass frit having a much lower melting point and better wetting properties.

7. The method of making a thermoelectric generator comprising inserting a metallic thermocouple and a slurry of glass frit mixtures into a metallic protective case and firing the assembly at a temperature sufficiently high to cause said frit to fuse substantially simultaneously to said thermocouple and to said protective case.

8. The method of making a thermoelectric generator comprising inserting a thermocouple unit of a plurality of strips of dissimilar metals and a slurry of glass frit into a metallic protective case, drying the slurry, and firing the assembly at a temperature sufficiently high to cause said frit to fuse substantially simultaneously to said thermocouple strips and to said protective case.

9. The process of making a thermoelectric generator comprising joining at least two strips of dissimilar metals together at one of their ends, heating said metals to oxidize their surfaces, inserting into a metallic protective case a slurry of glass frit including a large amount having a high melting point and a smaller amount having a substantially lower melting point and relatively strong fluxing and wetting properties, inserting said metals into said case and firing the assembly at a temperature just sufficient to fuse said frit to said case and strips.

References Cited in the file of this patent

UNITED STATES PATENTS

| | | |
|---|---|---|
| 2,321,657 | Chester | June 15, 1943 |
| 2,445,159 | Tegge | July 13, 1948 |
| 2,466,175 | Kretsch | Apr. 5, 1949 |
| 2,494,833 | Ray | Jan. 17, 1950 |
| 2,675,416 | Ray | Apr. 13, 1954 |
| 2,703,335 | Andrus | Mar. 1, 1955 |

FOREIGN PATENTS

| | | |
|---|---|---|
| 15,692 | Great Britain | of 1884 |